US009658912B2

(12) United States Patent
Gao (10) Patent No.: US 9,658,912 B2
(45) Date of Patent: May 23, 2017

(54) METHOD AND APPARATUS FOR IMPLEMENTING HEARTBEAT SERVICE OF HIGH AVAILABILITY CLUSTER

(71) Applicant: Huawei Technologies Co., Ltd., Shenzhen (CN)

(72) Inventor: Junli Gao, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 387 days.

(21) Appl. No.: 14/584,342

(22) Filed: Dec. 29, 2014

(65) Prior Publication Data

US 2015/0113340 A1    Apr. 23, 2015

Related U.S. Application Data

(63) Continuation of application No. PCT/CN2013/070155, filed on Jan. 7, 2013.

(30) Foreign Application Priority Data

Jun. 29, 2012 (CN) .......................... 2012 1 0222114

(51) Int. Cl.
*G06F 11/00* (2006.01)
*G06F 11/07* (2006.01)
(Continued)

(52) U.S. Cl.
CPC ........ *G06F 11/0757* (2013.01); *G06F 11/073* (2013.01); *G06F 11/0709* (2013.01);
(Continued)

(58) Field of Classification Search
CPC ............ G06F 11/0757; G06F 11/0709; G06F 11/073; G06F 11/202
See application file for complete search history.

(56) References Cited

U.S. PATENT DOCUMENTS 7,353,259 B1 * 4/2008 Bakke ................ G06F 9/44505
709/208
7,587,465 B1 * 9/2009 Muchow ............... G06F 9/5061
709/208

(Continued)

FOREIGN PATENT DOCUMENTS

CN    101234018 A    8/2008
CN    101465769 A    6/2009
(Continued)

*Primary Examiner* — Charles Ehne
(74) *Attorney, Agent, or Firm* — Leydig, Voit & Mayer, Ltd.

(57) ABSTRACT

Embodiments of the present invention provide a method for implementing a heartbeat service of a high availability cluster, including: writing, by a server, heartbeat counting information to a disk array, where the heartbeat counting information includes a write heartbeat message sequence number, a read peer heartbeat message sequence number, active-standby state information, a heartbeat message, and a heartbeat message length of the server, so that one or more corresponding servers read the heartbeat counting information, in the disk array, of the server; and reading heartbeat counting information, which is written by the one or more corresponding servers to the disk array, of the one or more corresponding servers, and repeating the write operation and the read operation. Correspondingly, the embodiments of the present invention further provide a server, which solves a spit-brain problem, and improves data security.

14 Claims, 3 Drawing Sheets

(51) Int. Cl.
  *H04L 12/26* (2006.01)
  *H04L 12/24* (2006.01)
  *G06F 11/20* (2006.01)
(52) U.S. Cl.
  CPC .......... *H04L 41/0677* (2013.01); *H04L 43/10* (2013.01); *G06F 11/202* (2013.01)

(56) References Cited

U.S. PATENT DOCUMENTS

| | | | | |
|---|---|---|---|---|
| 2003/0233594 | A1* | 12/2003 | Earl | G06F 11/0709 |
| | | | | 714/4.11 |
| 2004/0090943 | A1* | 5/2004 | da Costa | H04L 41/0806 |
| | | | | 370/338 |
| 2005/0050392 | A1 | 3/2005 | Baba et al. | |
| 2008/0082142 | A1* | 4/2008 | Clark | G06F 11/0757 |
| | | | | 607/60 |
| 2010/0195489 | A1* | 8/2010 | Zhou | H04L 12/433 |
| | | | | 370/216 |
| 2012/0188928 | A1* | 7/2012 | Wang | H04L 43/0811 |
| | | | | 370/311 |

FOREIGN PATENT DOCUMENTS

| | | |
|---|---|---|
| CN | 101916217 A | 12/2010 |
| CN | 102014416 A | 4/2011 |
| CN | 102799394 A | 11/2012 |

\* cited by examiner

METHOD AND APPARATUS FOR IMPLEMENTING HEARTBEAT SERVICE OF HIGH AVAILABILITY CLUSTER

CROSS-REFERENCE TO RELATED APPLICATIONS

This application is a continuation of International Patent Application No. PCT/CN2013/070155, filed on Jan. 7, 2013, which claims priority to Chinese Patent Application No. 201210222114.1, filed on Jun. 29, 2012, both of which are hereby incorporated by reference in their entireties.

TECHNICAL FIELD

Embodiments of the present invention relate to the field of communications technologies, and in particular, to a method and apparatus for implementing a heartbeat service of a high availability cluster.

BACKGROUND

A challenge which accompanies the use of large-capacity relational databases in carrier-grade IT is massive data. To address this challenge, a system is required to provide a large capacity, high-speed access, and a high reliability mechanism. In the system, a high availability (High Availability, HA) cluster is required to reliably and effectively switch a database service to a standby server. Generally, in a dual-host mode of a disk array, an active server and a standby server transfer control information such as a heartbeat and switchover by using a heartbeat service; the heartbeat service is transmitted on hardware other than a disk array, such as an IP facility, a time division multiplexer, an optical fiber, or a serial port.

When the heartbeat service is faulty, the HA cluster is split into two or more independent individuals, instead of operating as a whole. The individuals lose contact with each other, and all consider that the other individuals are faulty. As a result, all the independent individuals contend for a shared resource, and read and write shared storage simultaneously, that is, perform a read/write operation on a disk array simultaneously, thereby resulting in data corruption, which is called split-brain. It is difficult, time-consuming and labor-intensive to recover corrupted data, and the data is very likely to be completely corrupted, which leads to unpredictable economic loss.

In the prior art, split-brain may be prevented by means of using a redundant heartbeat link, that is, a heartbeat is transferred by the Transmission Control Protocol (Transmission Control Protocol, TCP), the User Datagram Protocol (User Datagram Protocol, UDP), a serial port or the like, so as to reduce occurrences of split-brain in a scenario of active/standby setup, and ensure security of a critical resource database. The foregoing manners for transferring a heartbeat may be used simultaneously; or only one of them is used, and the rest are regarded as candidates. However, when a redundant heartbeat link is faulty, split-brain inevitably occurs.

SUMMARY

Embodiments of the present invention provide a method and apparatus for implementing a heartbeat service of a high availability cluster, thereby solving a split-brain problem, and improving data security.

The embodiments of the present invention provide a method for implementing a heartbeat service of a high availability cluster, including:

writing, by a server, heartbeat counting information to a disk array, where the heartbeat counting information includes a write heartbeat message sequence number, a read peer heartbeat message sequence number, active-standby state information, a heartbeat message, and a heartbeat message length of the server, so that one or more corresponding servers read the heartbeat counting information, in the disk array, of the server; and reading heartbeat counting information, which is written by the one or more corresponding servers to the disk array, of the one or more corresponding servers, and repeating the write operation and the read operation.

The embodiments of the present invention further provide a server for implementing a heartbeat service of a high availability cluster, including:

a writing unit, configured to write heartbeat counting information to a disk array, where the heartbeat counting information includes a write heartbeat message sequence number, a read peer heartbeat message sequence number, active-standby state information, a heartbeat message, and a heartbeat message length of the server, so that one or more corresponding servers read the heartbeat counting information, in the disk array, of the server; and a reading unit, configured to read heartbeat counting information, which is written by the one or more corresponding servers to the disk array, of the one or more corresponding servers; where the writing unit and the reading unit are further configured to repeat the write operation and the read operation respectively.

According to the method for implementing a heartbeat service of a high availability cluster provided by the embodiments of the present invention, an active server and a standby server perform a read/write operation on a magnetic disk that is used to store heartbeat counting information, thereby solving a split-brain problem, and improving data security.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Embodiment 1 of the Present Invention

Figure 1:
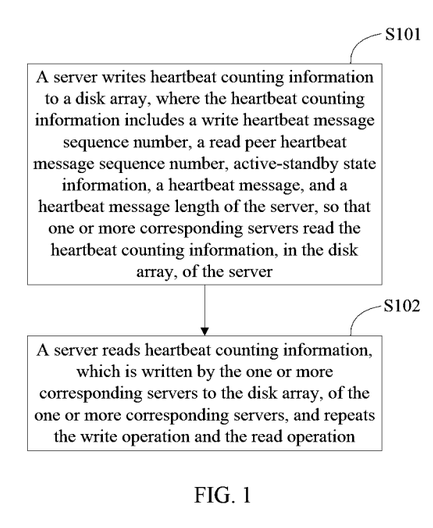
FIG. 1 is a flowchart of a method according to Embodiment 1 of the present invention.

FIG. 1 is a flowchart of a method embodiment for implementing a heartbeat service of a high availability cluster according to the present invention. As shown in FIG. 1, the method may include:

S101: A server writes heartbeat counting information to a disk array, where the heartbeat counting information includes a write heartbeat message sequence number, a read peer heartbeat message sequence number, active-standby state information, a heartbeat message, and a heartbeat message length of the server, so that one or more corresponding servers read the heartbeat counting information, in the disk array, of the server.

For a high availability cluster based on a disk array manner, the disk array manner is a manner in which data integrity and continuity is mainly safeguarded by a disk array in the event of a switchover. User data is generally stored in a disk array. When an active server breaks down, a standby server continues to acquire original data from the disk array.

Dual-server hot standby (hot standby between two high availability servers) is used as an example. A disk array is partitioned into three logical disks, which are herein respectively called V1, V2, and DB. Both V1 and V2 are used for writing and reading of heartbeat data, and may also be used for writing and reading of an active-standby state of a server, and DB is used to record user data. Sizes of V1, V2 and DB may be customized, and may also be planned according to a specific requirement. For example, V1 and V2 do not require large space, and relatively small logical space may be allocated to V1 and V2; and remaining logical space is allocated to DB. Content in V1 and V2 is organized in a same fashion, as shown in Table 1.

It should be noted that, the active state is a state in which a server among the dual servers uses a disk array to provide a service, and the standby state is a state in which a server among the dual servers does not use the disk array to provide a service. The activation preparation state is a state in which when detecting that the active server is faulty, the standby server prepares to be activated; the standby server remains in the activation preparation state for a period of time to prevent contention from a peer, and when detecting activation preparation, the peer does not contend for a resource in order to take the active role. A state of being activated refers to a state in which the activation preparation state ends, and activating a resource and mounting a disk array start.

Writing to the disk array may be implemented by the server in a physical input/output manner, and may also be implemented in an operating system based file input/output manner.

After the server writes the heartbeat counting information to the disk array, the one or more corresponding servers read the heartbeat counting information, in the disk array, of the server.

It can be seen from Table 1 that, when the server performs writing successfully, the write heartbeat message sequence number of the server needs to increases once. A default positive integer may be defined, and each time one write is performed, the positive integer is added to the write heartbeat message sequence number, to obtain a new write heartbeat message sequence number. Each time after the server reads heartbeat counting information, in the disk array, of the one or more corresponding servers, the positive integer also needs to be added to the read peer heartbeat message sequence number of the server, to obtain a new read peer heartbeat message sequence number. Likewise, each time after the one or more corresponding servers perform one write operation, the positive integer is added to a write heartbeat message sequence number of the one or more corresponding servers, to obtain a new write heartbeat

TABLE 1

| Sequence Number | Field name | Type | Meaning |
|---|---|---|---|
| 1 | Current active-standby state of local end | Unsigned integer, 32 bits | One write is performed regularly (for example, 1s), and writing to a local voting disk partition is implemented in a physical IO manner. For example: 0x5A5A0000 indicates an active state 0x5A000000 indicates a state of being activated 0x00005A5A indicates a standby state 0x0000005A indicates an activation preparation state |
| 2 | Write message sequence number WSeq of local end | Unsigned integer, 32 bits | Each time after a message is written, the counter increases once, and writing to a local voting disk partition is implemented in a physical I/O manner or an operating system based file I/O manner. |
| 3 | Read peer message sequence number RSeq of local end | Unsigned integer, 32 bits | Each time after a message from a peer is read, the counter increases once, and writing to a local voting disk partition is implemented in a physical I/O manner or an operating system based file I/O manner. |
| 4 | Heartbeat message length | Unsigned integer, 32 bits | Message area length, which is not greater than 64 KB |
| 5 | Heartbeat message | BYTES | Heartbeat message of active and standby servers | message sequence number, and each time after one read operation is performed, the positive integer also needs to be added to a read peer heartbeat message sequence number of the one or more corresponding servers, to obtain a new read peer heartbeat message sequence number.

S102: The server reads heartbeat counting information of the one or more corresponding servers which is written by the one or more corresponding servers to the disk array, and repeats the write operation and the read operation.

Dual-server hot standby is used as an example. If the server is the active, the corresponding server is the standby; or if the server is the standby, the corresponding server is the active. In this example, the server is the active and the corresponding server is the standby. When the standby server writes heartbeat counting information to the disk array, the active server reads the heartbeat counting information written by the standby server. A type of the read heartbeat counting information is consistent with a type of the heartbeat counting information that is written by the active server. For ease of description, a write heartbeat message sequence number of the active server is defined as WSeq1, a read peer heartbeat message sequence number of the active server is defined as RSeq1, a write heartbeat message sequence number of the standby server is defined as WSeq2, and a read peer heartbeat message sequence number of the standby server is defined as RSeq2. In a whole process, time points t1 to t4 may be used as an example, which is specifically as follows:

During initialization, it is defined that WSeq1=RSeq2=0X0001, and WSeq2=RSeq1=0X0001. At time t1, the active server writes heartbeat counting information to V1, where the heartbeat counting information includes a write heartbeat message sequence number WSeq1 of the active server, a read peer heartbeat message sequence number RSeq1 of the active server, active-standby state information, a heartbeat message, and a heartbeat message length. Specifically, WSeq1=0X0001, and RSeq1=0X0001. After a procedure of t1 ends, 1 is added to WSeq1 to obtain WSeq1=0X0002. Then, at time t2 (t2>t1), the standby server reads the heartbeat counting information in V1, where the read heartbeat counting information is specifically RSeq1=WSeq1=0X0001. After a procedure of t2 ends, 1 is added to RSeq2 to obtain RSeq2=0X0002. Afterwards, at time t3 (t3>t2), the standby server writes heartbeat counting information to V2, where the heartbeat counting information that is written by the standby server includes a write heartbeat message sequence number WSeq2 of the standby server, a read peer heartbeat message sequence number RSeq2 of the standby server, active-standby state information, a heartbeat message, and a heartbeat message length. Specifically, WSeq2=0X0001, and RSeq2=0X0002. After a procedure of t3 ends, 1 is added to WSeq2 to obtain WSeq2=0X0002. Finally, at time t4 (t4>t3), the active server reads the heartbeat counting information in V2, where the read heartbeat counting information is RSeq2=0X0002, and WSeq2=0X0001. After a procedure of t4 ends, 1 is added to RSeq1 to obtain 0X0002.

It should be noted that, each time after the active server reads the heartbeat counting information, in the disk array, of the standby server, the active server needs to determine whether WSeq1 stored in the active server is equal to RSeq2 read from the disk array. If WSeq1 is equal to RSeq2, a next write operation is performed; or if WSeq1 is not equal to RSeq2, it is determined that the disk array is abnormal. A reason why the disk array is abnormal may be because a misoperation is performed on the disk array by a third party, or may be because a fault occurs in the disk array. In this case, the active server sets WSeq1 to RSeq2, and rewrites RSeq2 to V1 by following a same procedure as described above. Likewise, for the standby server, each time after the standby server reads the heartbeat counting information in the disk array, the standby server needs to determine whether WSeq2 stored in the standby server is equal to RSeq1 read from the disk array. If WSeq2 is equal to RSeq1, a next write operation is performed; or if WSeq2 is not equal to RSeq1, WSeq2 is set to RSeq1, and RSeq1 is rewritten to V2. In this way, a disk array based heartbeat protection mechanism may be provided, which exhibits a strong self-healing ability to deal with cases where a disk array is abnormal.

When a heartbeat link is faulty, a link between the active or standby server and the disk array is also faulty; and even if split-brain occurs, the faulty server, either active or standby, cannot access the disk array. Therefore, the active and standby servers do not perform reading or writing on the disk array at the same time, which effectively safeguards data security.

In the method for implementing a heartbeat service of a high availability cluster provided by this embodiment of the present invention, an active server and a standby server perform a read/write operation on a magnetic disk that is used to store heartbeat counting information, thereby solving a split-brain problem, and improving data security.

Embodiment 2 of the Present Invention

Figure 2:
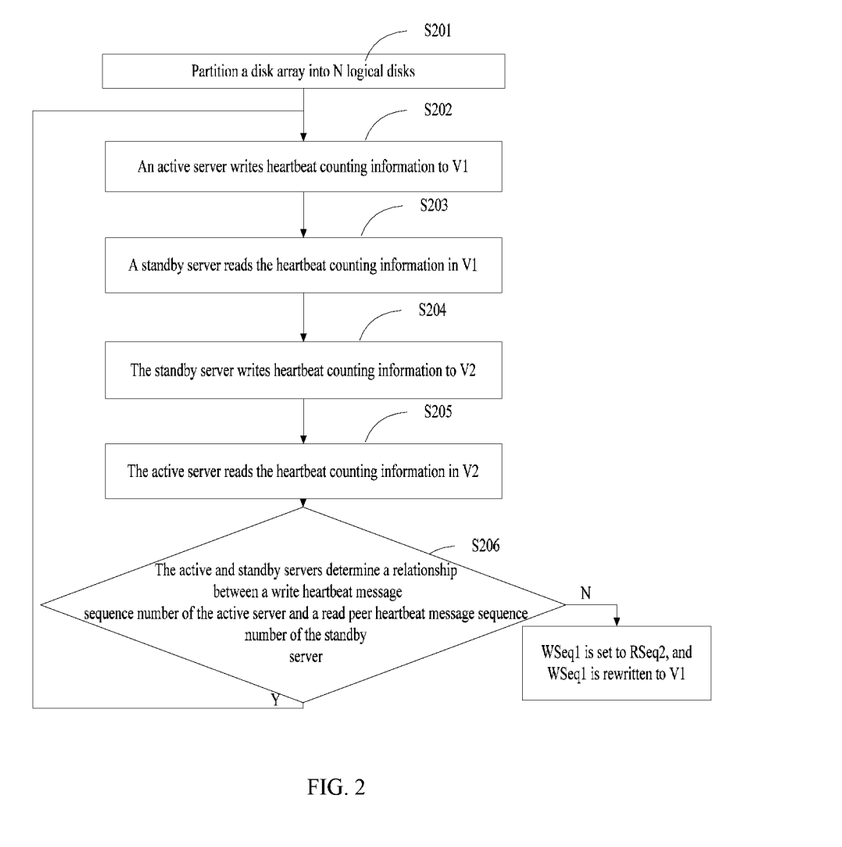
FIG. 2 is a flowchart of a method according to Embodiment 2 of the present invention.

As shown in FIG. 2, in this embodiment, a process of a method for implementing a heartbeat service of a high availability cluster is as follows:

S201: Partition a Disk Array into N Logical Disks.

For a high availability cluster based on a disk array manner, the disk array manner is a manner in which data integrity and continuity is mainly safeguarded by a disk array in the event of a switchover. User data is generally stored in a disk array. When an active server breaks down, a standby server continues to acquire original data from the disk array.

In dual-server hot standby setup (hot standby between two high availability servers), a service needs to be executed by two servers. One server is in an activated state, and is called an active server; and the other server is in a standby state, and is called a standby server.

Dual-server hot standby is used as an example. A disk array is partitioned into three logical disks, which are herein respectively called V1, V2, and DB. Both V1 and V2 are used for writing and reading of heartbeat data, and may also be used for writing and reading of an active-standby state of a server, and DB is used to record user data. Sizes of V1, V2 and DB may be customized, and may also be planned according to a specific requirement. For example, V1 and V2 do not require large space, and relatively small logical space may be allocated to V1 and V2; and remaining logical space is allocated to DB. Content of V1 and V2 is organized in a same fashion, as shown in Table 1 of Embodiment 1.

It should be noted that, for a high-availability clusters with more than two active servers, the number of logical disks into which a disk array is partitioned is N, where N is a positive integer greater than 3.

S202: An Active Server Writes Heartbeat Counting Information to V1.

The active server writes the heartbeat counting information to V1 in a physical input/output reading and writing manner, and may also write the heartbeat counting information to V1 in an operating system based file input/output manner. The heartbeat counting information includes a write heartbeat message sequence number, a read peer heartbeat message sequence number, active-standby state information, a heartbeat message, and a heartbeat message length. Each time after one write is performed successfully, N is added to the write heartbeat message sequence number, where N is a default positive integer. For ease of understanding, in this embodiment, each time after one write is performed successfully, 1 is added to the write heartbeat message sequence number. The read peer heartbeat message sequence number is a write heartbeat message sequence number, which is written by a standby server and read by the active server, in V2. The active-standby state information indicates whether a server is in the active state or standby state. For a service, the active state and the standby state are interchangeable. If the active server breaks down, the standby server may take the active role, and the original active server is downgraded to be a standby server.

S203: A Standby Server Reads the Heartbeat Counting Information in V1.

The standby server reads the heartbeat counting information in V1, and after a read peer heartbeat message sequence number of the standby server is set to the write heartbeat message sequence number of the active server which is read by the standby server, each time after one read is successfully performed, 1 is added to the read peer heartbeat message sequence number of the standby server.

For ease of description, a write heartbeat message sequence number of the active server is defined as WSeq1, a read peer heartbeat message sequence number of the active server is defined as RSeq1, a write heartbeat message sequence number of the standby server is defined as WSeq2, and a read peer heartbeat message sequence number of the standby server is defined as RSeq2. After the active server writes the heartbeat counting information to V1, WSeq1 to be written to V1 next time is currently written WSeq1+1; and after the standby server reads the heartbeat counting information in V1, RSeq2 to be read next time is currently read RSeq2+1. For example, during initialization, it is defined that WSeq1=RSeq2=0X0001, and WSeq2=RSeq1=0X0001. At time t1, the active server writes heartbeat counting information to V1, where the heartbeat counting information includes a write heartbeat message sequence number WSeq1 of the active server, a read peer heartbeat message sequence number RSeq1 of the active server, active-standby state information, a heartbeat message, and a heartbeat message length. Specifically, WSeq1=0X0001, and RSeq1=0X0001. After a procedure of t1 ends, 1 is added to WSeq1 to obtain WSeq1=0X0002. Then, at time t2 (t2>t1), the standby server reads the heartbeat counting information in V1, where the read heartbeat counting information is specifically RSeq1=WSeq1=0X0001. After a procedure of t2 ends, 1 is added to RSeq2 to obtain RSeq2=0X0002.

S204: The Standby Server Writes Heartbeat Counting Information to V2.

The specific procedure of writing, by the standby server, heartbeat counting information to V2 is the same as S202. Looking back to the foregoing example, at time t3 (t3>t2), the standby server writes heartbeat counting information to V2, where the heartbeat counting information written by the standby server includes a write heartbeat message sequence number WSeq2 of the standby server, a read peer heartbeat message sequence number RSeq2 of the standby server, active-standby state information, a heartbeat message, and a heartbeat message length. Specifically, WSeq2=0X0001, and RSeq2=0X0002. After a procedure of t3 ends, 1 is added to WSeq2 to obtain WSeq2=0X0002.

S205: The Active Server Reads the Heartbeat Counting Information in V2.

A type of the heartbeat counting message in V2 is consistent with a type of the heartbeat counting message in V1. Referring back to the foregoing example, at time t4 (t4>t3), the active server reads the heartbeat counting information in V2, where the read heartbeat counting information is RSeq2=0X0002, and WSeq2=0X0001. After a procedure of t4 ends, 1 is added to RSeq1 to obtain 0X0002.

If original buffers of V1 and V2 are full, a new buffer may be additionally used; or previously written information is overwritten, starting from the initial location to which the information was written to the buffers of V1 and V2.

S206: Determine a relationship between a write heartbeat message sequence number of the active server and a read peer heartbeat message sequence number of the standby server.

Before writing or reading is performed, both the active server and the standby server make determination as to write heartbeat message sequence numbers stored in them and read peer heartbeat message sequence numbers read from the disk array. According to a relationship among RSeq1, RSeq2, WSeq1, and WSeq2 at time points t1 to t4, it is apparent that, when WSeq1 is equal to RSeq2, or equal to RSeq2+1, the active server is in a normal state; and likewise, when WSeq2 is equal to RSeq1, or equal to RSeq1+1, the standby server is in a normal state. Specifically, the active server determines, before writing is performed, whether WSeq1 is equal to RSeq2, and determines, before reading is performed, whether WSeq1 is equal to RSeq2+1; and the standby server determines, before writing is performed, whether WSeq2 is equal to RSeq1, and determines, before reading is performed, whether WSeq2 is equal to RSeq1+1. When the active server determines that WSeq1 is equal to RSeq2, or equal to RSeq2+1, the active server repeats the write operation and the read operation. Likewise, when the standby server determines that WSeq2 is equal to RSeq1, or equal to RSeq1+1, the standby server repeats the write operation and the read operation. Referring again to the foregoing example, at time t5, the active server writes heartbeat counting information to V1 for a second time. At this time, RSeq1=WSeq1=0X0002. After a procedure of t5 ends, 1 is added to WSeq1 to obtain WSeq1=0X0003. At time t6, the standby server reads the heartbeat counting information in V1 for a second time. At this time, the read heartbeat counting information is WSeq1=RSeq1=0X0002.

In this way, when the active server determines that WSeq1 is not equal to RSeq2+1, and not equal to RSeq2, it is determined that the disk array is abnormal. A reason why the disk array is abnormal may be because a misoperation is performed on the disk array by a third party, or may be because a fault occurs in the disk array. In this case, the active server sets WSeq1 to RSeq2, and rewrites RSeq2 to V1 by following a same procedure as described above. Likewise, when the standby server determines that WSeq2 is not equal to RSeq1+1, and not equal to RSeq1, it is determined that the disk array is abnormal. The standby server sets WSeq2 to RSeq1, and rewrites RSeq1 to V2 by following a same procedure as described above. In this way, a disk array based heartbeat protection mechanism may be provided, which exhibits a strong self-healing ability to deal with cases where a disk array is abnormal.

When a heartbeat link is faulty, a link between the active or standby server and the disk array is also faulty; and even if a split-brain situation occurs, the faulty active or standby server cannot access the disk array. Therefore, the active server and standby server do not perform reading or writing on the disk array at the same time, which effectively safeguards data security.

In the event of multiple clusters, a disk array may be partitioned into multiple arrays (for example, allocated as V1, V2, V3 . . . and DB that is used to store user data), a process of which is the same as the process in the event of dual-server hot standby.

In the method for implementing a heartbeat service of a high availability cluster provided by this embodiment of the present invention, an active server and a standby server perform a read/write operation on a magnetic disk that is used to store heartbeat counting information, thereby solving a split-brain problem, and improving data security.

Embodiment 3 of the Present Invention

Figure 3:
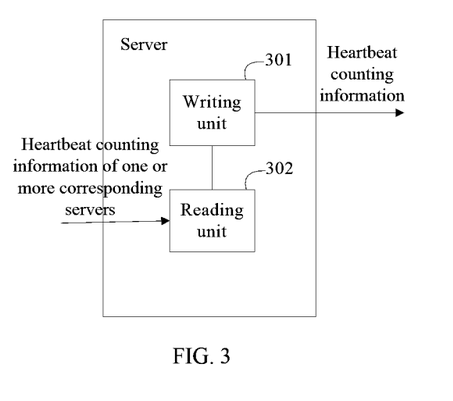
FIG. 3 is an apparatus diagram of a server according to Embodiment 3 of the present invention.

This embodiment of the present invention provides a server for implementing a heartbeat service of a high availability cluster. As shown in FIG. 3, the server includes a writing unit 301 and a reading unit 302.

The writing unit 301 is configured to write heartbeat counting information to a disk array, where the heartbeat counting information includes a write heartbeat message sequence number, a read peer heartbeat message sequence number, active-standby state information, a heartbeat message, and a heartbeat message length of the server, so that one or more corresponding servers read the heartbeat counting information, in the disk array, of the server.

For a high availability cluster based on a disk array manner, the disk array manner is a manner in which data integrity and continuity is mainly safeguarded by a disk array in the event of a switchover. User data is generally stored in a disk array. When an active server breaks down, a standby server continues to acquire original data from the disk array.

Dual-server hot standby (hot standby between two high availability servers) is used as an example. A disk array is partitioned into three logical disks, which are herein respectively called V1, V2, and DB. Both V1 and V2 are used for writing and reading of heartbeat data, and may also be used for writing and reading of an active-standby state of a server, and DB is used to record user data. Sizes of V1, V2 and DB may be customized, and may also be planned according to a specific requirement. For example, V1 and V2 do not require large space, and relatively small logical space may be allocated to V1 and V2; and remaining logical space is allocated to DB. Content of V1 and V2 is organized in a same fashion, as shown in Table 1 of Embodiment 1.

The writing unit 301 may perform writing to the disk array in a physical input/output manner, and may also perform writing to the disk array in an operating system based file input/output manner.

When the writing unit 301 performs writing successfully, an accumulating unit increases the write heartbeat message sequence number once. A default positive integer may be defined, and each time one write is performed, the positive integer is added to the write heartbeat sequence number, to obtain a new write heartbeat message sequence number. Each time after the reading unit of the server reads heartbeat counting information, in the disk array, of the one or more corresponding servers, the accumulating unit of the server also needs to add the positive integer to the read peer heartbeat message sequence number of the server, to obtain a new read peer heartbeat message sequence number. Likewise, each time after the one or more corresponding servers perform one write operation, the positive integer is added to a write heartbeat message sequence number of the one or more corresponding servers, to obtain a new write heartbeat message sequence number, and each time after one read operation is performed, the positive integer also needs to be added to a read peer heartbeat message sequence number of the one or more corresponding servers, to obtain a new read peer heartbeat message sequence number.

The reading unit 302 is configured to read heartbeat counting information, which is written by the one or more corresponding servers to the disk array, of the one or more corresponding servers, where the writing unit 301 and the reading unit 302 are further configured to repeat the write operation and the read operation respectively.

Dual-server hot standby is used as an example. If the server is an active server, the corresponding server is a standby server; or if the server is a standby server, the corresponding server is an active server.

In this example, the server is an active server and the corresponding server is a standby server. When the standby server writes heartbeat counting information to the disk array, the reading unit 302 of the active server reads the heartbeat counting information written by the standby server. A type of the read heartbeat counting information is consistent with a type of the heartbeat counting information that is written by the active server.

For ease of description, a write heartbeat message sequence number of the active server is defined as WSeq1, a read peer heartbeat message sequence number of the active server is defined as RSeq1, a write heartbeat message sequence number of the standby server is defined as WSeq2, and a read peer heartbeat message sequence number of the standby server is defined as RSeq2. In a whole process, time points t1 to t4 may be used as an example, which is specifically as follows:

During initialization, it is defined that WSeq1=RSeq2=0X0001, and WSeq2=RSeq1=0X0001. At time t1, the writing unit 301 of the active server writes heartbeat counting information to V1, where the heartbeat counting information includes a write heartbeat message sequence number WSeq1 of the active server, a read peer heartbeat message sequence number RSeq1 of the active server, active-standby state information, a heartbeat message, and a heartbeat message length. Specifically, WSeq1=0X0001, and RSeq1=0X0001. After a procedure of t1 ends, the accumulating unit of the active server adds 1 to WSeq1 to obtain WSeq1=0X0002. Then, at time t2 (t2>t1), the reading unit of the standby server reads the heartbeat counting information in V1, and the read heartbeat counting information is specifically RSeq1=WSeq1=0X0001. After a procedure of t2 ends, the accumulating unit of the standby server adds 1 to RSeq2 to obtain RSeq2=0X0002. Afterwards, at time t3 (t3>t2), the writing unit of the standby server writes heartbeat counting information to V2, where the heartbeat counting information written by the writing unit of the standby server includes a write heartbeat message sequence number WSeq2 of the standby server, a read peer heartbeat message sequence number RSeq2 of the standby server, active-standby state information, a heartbeat message, and a heartbeat message length. Specifically, WSeq2=0X0001, and RSeq2=0X0002. After a procedure of t3 ends, the accumulating unit of the standby server adds 1 to WSeq2 to obtain WSeq2=0X0002. Finally, at time t4 (t4>t3), the reading unit 302 of the active server reads the heartbeat counting information in V2, where the read heartbeat counting information is RSeq2=0X0002, and WSeq2=0X0001. After a procedure of t4 ends, the accumulating unit of the active server adds 1 to RSeq1 to obtain 0X0002.

It should be noted that, each time after the reading unit 302 of the active server reads the heartbeat counting information, in the disk array, of the standby server, a determining unit of the active server needs to determine whether WSeq1 stored in the active server is equal to RSeq2 read from the disk array. If WSeq1 is equal to RSeq2, the writing unit 301 performs a next write operation; or if WSeq1 is not equal to RSeq2, the determining unit determines that the disk array is abnormal. A reason why the disk array is abnormal may be because a misoperation is performed on the disk array by a third party, or may be because a fault occurs in the disk array. In this case, the writing unit of the active server sets WSeq1 to RSeq2, and rewrites RSeq2 to V1 by following a same procedure as described above. Likewise, for the standby server, each time after the reading unit of the standby server reads the heartbeat counting information in the disk array, the determining unit of the standby server needs to determine whether WSeq2 stored in the standby server is equal to RSeq1 read from the disk array. If WSeq2 is equal to RSeq1, a next write operation is performed; or if WSeq2 is not equal to RSeq1, the writing unit of the standby server sets WSeq2 to RSeq1, and rewrites RSeq1 to V2. In this way, a disk array based heartbeat protection mechanism may be provided, which exhibits a strong self-healing ability to deal with cases where a disk array is abnormal.

Another manner in which the determining units of the active server and the standby server make determination may be that: before the writing units of the active server and standby server performs writing or their reading units performs reading, the determining units of the active server and the standby server determine write heartbeat message sequence numbers stored in themselves and read peer heartbeat message sequence numbers read from the disk array. According to a relationship among RSeq1, RSeq2, WSeq1 and WSeq2 at time points t1 to t4, it is apparent that, when WSeq1 is equal to RSeq2, or equal to RSeq2+1, the active server is in a normal state; and likewise, when WSeq2 is equal to RSeq1, or equal to RSeq1+1, the standby server is in a normal state. Specifically, the active server determines, by using the determining unit before writing is performed by the writing unit, whether WSeq1 is equal to RSeq2, and determines, by using the determining unit before reading is performed by the reading unit, whether WSeq1 is equal to RSeq2+1; and the standby server determines, by using the determining unit before writing is performed by the writing unit, whether WSeq2 is equal to RSeq1, and determines, by using the determining unit before reading is performed by the reading unit, whether WSeq2 is equal to RSeq1+1. As a result, when the determining unit of the active server determines that WSeq1 is equal to RSeq2, or equal to RSeq2+1, the writing unit of the active server performs a next write operation, or the reading unit performs a next read operation. Likewise, when the determining unit of the standby server determines that WSeq2 is equal to RSeq1, or equal to RSeq1+1, the writing unit of the standby server performs a next write operation, or the reading unit performs a next read operation. However, when the determining unit of the active server determines that WSeq1 is not equal to RSeq2+1, and not equal to RSeq2, it is determined that the disk array is abnormal. A reason why the disk array is abnormal may be because a misoperation is performed on the disk array by a third party, or may be because a fault occurs in the disk array. In this case, the writing unit of the active server sets WSeq1 to RSeq2, and rewrites RSeq2 to V1 by following a same procedure as described above. Likewise, when the determining unit of the standby server determines that WSeq2 is not equal to RSeq1+1, and not equal to RSeq1, it is determined that the disk array is abnormal. The writing unit of the standby server sets WSeq2 to RSeq1, and rewrites RSeq1 to V2 by following a procedure as described above.

When a heartbeat link is faulty, a link between the active or standby server and the disk array is also faulty; and even if a split-brain situation occurs, a faulty server, either active or standby, cannot access the disk array. Therefore, the active server and standby server do not perform reading or writing on the disk array at the same time, which effectively protects data security.

In the server for implementing a heartbeat service of a high availability cluster provided by this embodiment of the present invention, a writing unit of the server performs one write operation on a magnetic disk that is used to store heartbeat counting information, and a reading unit of the server performs one read operation on the magnetic disk that is used to store the heartbeat counting information, thereby solving a split-brain problem, and improving data security.

It may be clearly understood by persons skilled in the art that, for the purpose of convenient and brief description, for a detailed working process of the foregoing system, device, and unit, reference may be made to a corresponding process in the foregoing method embodiments, and details are not described herein again.

It should be understood by persons skilled in the art that the accompanying drawings are merely schematic diagrams of an embodiment, and units or processes in the accompanying drawings are not necessarily required for implementing the present invention.

In the several embodiments provided in the present application, it should be understood that the disclosed system, device, and method may be implemented in other manners. For example, the described device embodiment is merely exemplary. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method for implementing a heartbeat service of a high availability cluster, comprising:
   writing, by a writing unit of a server, heartbeat counting information to a disk array, wherein the heartbeat counting information comprises a write heartbeat message sequence number, a read peer heartbeat message sequence number, active-standby state information, a heartbeat message, and a heartbeat message length of the server, to enable one or more corresponding servers to read the heartbeat counting information, in the disk array, of the server;
   reading heartbeat counting information, by a reading unit of the server, which is written by the one or more corresponding servers to the disk array, of the one or more corresponding servers;
   repeating the above write process by the writing unit and the above read process by the reading unit; and
   wherein the heartbeat counting information of the one or more corresponding servers comprises a write heartbeat message sequence number, a read peer heartbeat message sequence number, active-standby state information, a heartbeat message, and a heartbeat message length of the one or more corresponding servers.

2. The method according to claim 1, comprising:
   each time after the server performs one write operation, adding, by an accumulating unit of the server, a default positive integer to the write heartbeat message sequence number of the server, to obtain a new write heartbeat message sequence number of the server; and
   each time after the server performs one read operation, adding, by the accumulating unit of the server, the default positive integer to the read peer heartbeat message sequence number of the server, to obtain a new read peer heartbeat message sequence number of the server; and after it is determined by a determining unit of the server that the write heartbeat message sequence number stored in the server is equal to the read peer heartbeat message sequence number of the one or more corresponding servers which is read from the disk array, performing a next write operation by the writing unit.

3. The method according to claim 2, wherein: after the server determines that the write heartbeat message sequence number stored in the server is not equal to the read peer heartbeat message sequence number of the one or more corresponding servers which is read from the disk array, the method further comprises:
   determining, by the determining unit of the server, that a state of the disk array is abnormal, and setting the write heartbeat message sequence number stored in the server to the read peer heartbeat message sequence number of the one or more corresponding servers which is read from the disk array; and
   writing the write heartbeat message sequence number, which is set by the server, to the disk array.

4. The method according to claim 1, comprising:
   each time before the server performs one write operation, determining, by a determining unit of the server, the write heartbeat message sequence number stored in the server is equal to the read peer heartbeat message sequence number of the one or more corresponding servers which is read from the disk array;
   each time after the server performs one write operation, adding, by an accumulating unit of the server, a default positive integer to the write heartbeat message sequence number of the server, to obtain a new write heartbeat message sequence number of the server;
   each time before the server performs one read operation, determining, by the determining unit of the server, the write heartbeat message sequence number stored in the server is equal to a sum of the read peer heartbeat message sequence number of the one or more corresponding servers which is read from the disk array and the default positive integer; and
   each time after the server performs one read operation, adding by the accumulating unit, the default positive integer to the read peer heartbeat message sequence number of the server, to obtain a new read peer heartbeat message sequence number of the server.

5. The method according to claim 4, wherein: after the server determines that the write heartbeat message sequence number stored in the server is not equal to the read peer heartbeat message sequence number of the one or more corresponding servers which is read from the disk array and the write heartbeat message sequence number stored in the server is not equal to a sum of the read peer heartbeat message sequence number of the one or more corresponding servers which is read from the disk array and the default positive integer, the method further comprises:
   determining, by the determining unit of the server, that a state of the disk array is abnormal, and setting the write heartbeat message sequence number stored in the server to the read peer heartbeat message sequence number of the one or more corresponding servers which is read from the disk array; and
   writing the write heartbeat message sequence number, which is obtained after the setting, to the disk array.

6. The method according to claim 1, wherein the server is an active server, and each of the one or more corresponding servers is a standby server.

7. The method according to claim 1, wherein the server is a standby server, and one of the one or more corresponding servers is an active server.

8. A server for implementing a heartbeat service of a high availability cluster, comprising:
   a writing unit, configured to write heartbeat counting information to a disk array, wherein the heartbeat counting information comprises a write heartbeat message sequence number, a read peer heartbeat message sequence number, active-standby state information, a heartbeat message, and a heartbeat message length of the server, to enable one or more corresponding servers to read the heartbeat counting information, in the disk array, of the server; and a reading unit, configured to read heartbeat counting information, which is written by the one or more corresponding servers to the disk array, of the one or more corresponding servers; wherein the heartbeat counting information of the one or more corresponding servers comprises a write heartbeat message sequence number, a read peer heartbeat message sequence number, active-standby state information, a heartbeat message, and a heartbeat message length of the one or more corresponding servers; wherein the writing unit and the reading unit are further configured to repeat the write operation and the read operation respectively.

9. The server according to claim 8, wherein the server further comprises:

an accumulating unit, configured to: each time after the server performs one write operation, add a default positive integer to the write heartbeat message sequence number of the server, to obtain a new write heartbeat message sequence number of the server;

the accumulating unit is further configured to: each time after the server performs one read operation, add the default positive integer to the read peer heartbeat message sequence number of the server, to obtain a new read peer heartbeat message sequence number of the server; and a determining unit, configured to determine the write heartbeat message sequence number stored in the server is equal to the read peer heartbeat message sequence number of the one or more corresponding servers which is read from the disk array;

the writing unit is further configured to: after the determining unit determines that the write heartbeat message sequence number stored in the server is equal to the read peer heartbeat message sequence number of the one or more corresponding servers which is read from the disk array, perform a next write operation.

10. The server according to claim 9, wherein that the writing unit of the server performs one write operation after the server determines that the write heartbeat message sequence number stored in the server is not equal to the read peer heartbeat message sequence number of the one or more corresponding servers which is read from the disk array further comprises that:

the determining unit determines that a state of the disk array is abnormal, and sets the write heartbeat message sequence number stored in the server to the read peer heartbeat message sequence number of the one or more corresponding servers which is read from the disk array; and writes the write heartbeat message sequence number, which is obtained after the setting, to the disk array.

11. The server according to claim 8, wherein the server further comprises:

a determining unit, configured to: each time before the writing unit performs one write operation, determine the write heartbeat message sequence number stored in the server is equal to the read peer heartbeat message sequence number of the one or more corresponding servers which is read from the disk array; and an accumulating unit, configured to: each time after the writing unit performs one write operation, add a default positive integer to the write heartbeat message sequence number of the server, to obtain a new write heartbeat message sequence number of the server;

the determining unit is further configured to: each time before the reading unit performs one read operation, determine the write heartbeat message sequence number stored in the server is equal to a sum of the read peer heartbeat message sequence number of the one or more corresponding servers which is read from the disk array and the default positive integer; and the accumulating unit is further configured to: each time after the reading unit performs one read operation, add the default positive integer to the read peer heartbeat message sequence number of the server, to obtain a new read peer heartbeat message sequence number of the server.

12. The server according to claim 11, wherein: after the determining unit of the server determines that the write heartbeat message sequence number stored in the server is not equal to the read peer heartbeat message sequence number of the one or more corresponding servers which is read from the disk array and the write heartbeat message sequence number stored in the server is not equal to a sum of the read peer heartbeat message sequence number of the one or more corresponding servers which is read from the disk array and the default positive integer, the server further comprises that:

the determining unit determines that a state of the disk array is abnormal, and sets the write heartbeat message sequence number stored in the server to the read peer heartbeat message sequence number of the one or more corresponding servers which is read from the disk array; and writes the write heartbeat message sequence number, which is obtained after the setting, to the disk array.

13. The server according to claim 8, wherein the server is an active server, and each of the one or more corresponding servers is a standby server.

14. The server according to claim 8, wherein the server is a standby server, and one of the one or more corresponding servers is an active server.

* * * * *